United States Patent
Nishimura et al.

(10) Patent No.: US 8,203,534 B2
(45) Date of Patent: Jun. 19, 2012

(54) ELECTRONIC APPARATUS

(75) Inventors: Hideki Nishimura, Kawasaki (JP);
Syunichi Yamashita, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 971 days.

(21) Appl. No.: 11/344,065

(22) Filed: Feb. 1, 2006

(65) Prior Publication Data
US 2006/0232564 A1    Oct. 19, 2006

(30) Foreign Application Priority Data

Feb. 4, 2005    (JP) .................................. 2005-28505

(51) Int. Cl.
*G06F 3/041*    (2006.01)

(52) U.S. Cl. ..... 345/173; 345/156; 345/174; 178/18.01; 178/18.05; 178/18.06; 178/18.07

(58) Field of Classification Search .................. 345/173, 345/178, 179, 156; 178/18.01, 18.05, 18.06, 178/18.07
See application file for complete search history.

(56) References Cited

U.S. PATENT DOCUMENTS

| | | | |
|---|---|---|---|
| 6,822,635 B2 * | 11/2004 | Shahoian et al. | 345/156 |
| 2002/0149561 A1 * | 10/2002 | Fukumoto et al. | 345/156 |
| 2004/0164971 A1 * | 8/2004 | Hayward et al. | 345/179 |
| 2004/0178996 A1 * | 9/2004 | Kurashima et al. | 345/173 |
| 2005/0057527 A1 * | 3/2005 | Takenaka et al. | 345/173 |
| 2007/0080951 A1 * | 4/2007 | Maruyama et al. | 345/173 |

FOREIGN PATENT DOCUMENTS

| | | |
|---|---|---|
| CN | 1396501 A | 12/2003 |
| JP | 2004-94389 A | 3/2004 |
| KR | 2004-0064271 A | 7/2004 |
| TW | 225618 B | 12/2004 |
| TW | 226211 B | 1/2005 |
| WO | WO 2004/021160 A1 | 3/2004 |

* cited by examiner

*Primary Examiner* — Lun-Yi Lao
*Assistant Examiner* — Insa Sadio
(74) *Attorney, Agent, or Firm* — Sughrue Mion, PLLC

(57) ABSTRACT

In an electronic apparatus having a touch panel and a chassis for supporting the touch panel, pair of fixing cushions are fixed to the touch panel along edges, which are parallel to each other, of the touch panel. Pair of vibration absorbing cushions are fixed to the chassis parallel to each other. A fixing flame is disposed between the touch panel and the chassis and fixed to the fixing cushions and the vibration absorbing cushions. Thus, the touch panel is supported against the chassis by the fixing cushions, the fixing frame and the vibration absorbing cushions. When the touch panel vibrates, the vibration absorbing cushions prevent transmission of the vibration from the touch panel to the chassis through fixing cushions and the fixing frame. Accordingly, the vibration of the touch panel hardly exercises a harmful influence on components mounted on the chassis.

4 Claims, 5 Drawing Sheets

ELECTRONIC APPARATUS

This application claims priority to prior application JP 2005-028505, the disclosure of which is incorporated herein by reference.

BACKGROUND OF THE INVENTION

This invention relates to an electronic apparatus, particularly, to improvement of an electronic apparatus which is configured so that a flat vibrating body (e.g. a touch panel) is vibrated by a vibrating element(s).

A touch panel is well known as an input device for an electronic apparatus. A type of the touch panel provides a vibrating function to give operation feeling to an operator.

The touch panel having the vibrating function vibrates when its surface is pressed with a finger of the operator, a stylus held by the operator, or the like. The vibration of the touch panel is transmitted to the operator through his/her finger or the like. Thus, the operator perceives whether input operation executed by the operator is accepted by the electronic apparatus or not.

A conventional electronic apparatus having the touch panel with the vibration function uses a single type of supporting members to fix the touch panel to a main body (or a supporting frame) and to support the touch panel against the main body. The supporting members are made of material which has flexibility and which hardly absorbs the vibration of the touch panel.

As mentioned above, in the conventional electronic apparatus, the touch panel is fixed to the main body with the single type of the supporting members made of the material which has flexibility and which hardly absorbs the vibration of the touch panel. Accordingly, the vibration of the touch panel is transmitted to the main body through the supporting members. It is possible that the vibration exercises a harmful influence on components (e.g. a liquid crystal display unit) and circuits housed in the main body.

Thus, the conventional electronic apparatus has a problem that the vibration of the touch panel is transmitted to the main body.

Such an electronic apparatus is disclosed in Unexamined Japanese Patent Publication No. 2004-94389.

SUMMARY OF THE INVENTION

It is therefore an object of this invention to provide an electrical apparatus capable of preventing transmission of vibration from a flat vibrating body to components mounted on a chassis which supports the flat vibrating body.

Other objects of this invention will become clear as the description proceeds.

According to an aspect of this invention, an electronic apparatus includes a flat vibrating body and a chassis used for supporting the flat vibrating body. The electronic apparatus comprises fixing cushions which are fixed to the flat vibrating body. Vibration absorbing cushions are fixed to the chassis. A fixing frame is disposed between the flat vibrating body and chassis and fixed to both the fixing cushions and the vibration absorbing cushions.

In the electronic apparatus, the fixing cushions and the vibration absorbing cushions may have slender shapes and be disposed parallel to one another.

The flat vibrating body may have a rectangular shape with pair of edges parallel to each other. In this case, the fixing cushions may be arranged along the edges.

The electronic apparatus may comprise pair of vibrating elements fixed to the flat vibrating body along different pair of edges of the flat vibrating body.

In the electronic apparatus, the flat vibrating body may be a touch panel.

The electronic apparatus may have a liquid crystal display panel mounted on the chassis.

BRIEF DESCRIPTION OF TEE DRAWINGS

DESCRIPTION OF THE PREFERRED EMBODIMENTS

Figure 1:
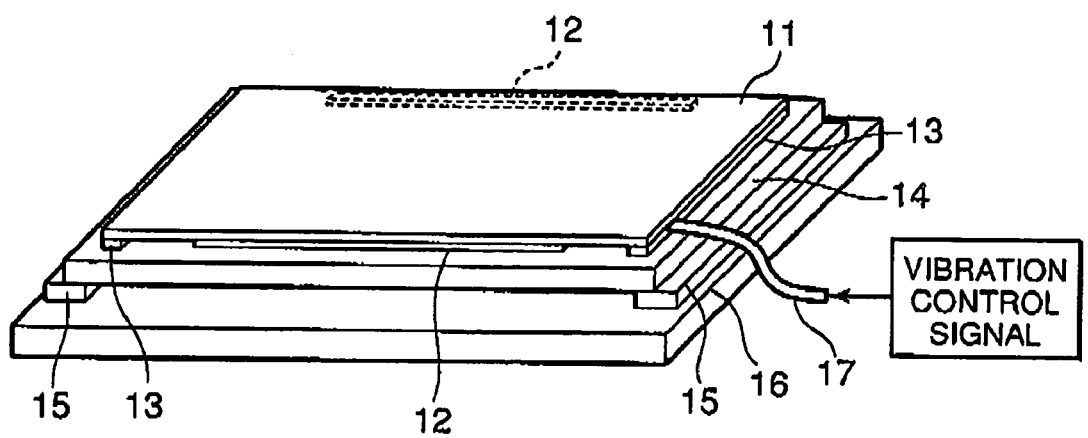
FIG. 1 is a perspective view of an electronic apparatus according to a first embodiment of this invention.
Figure 2:
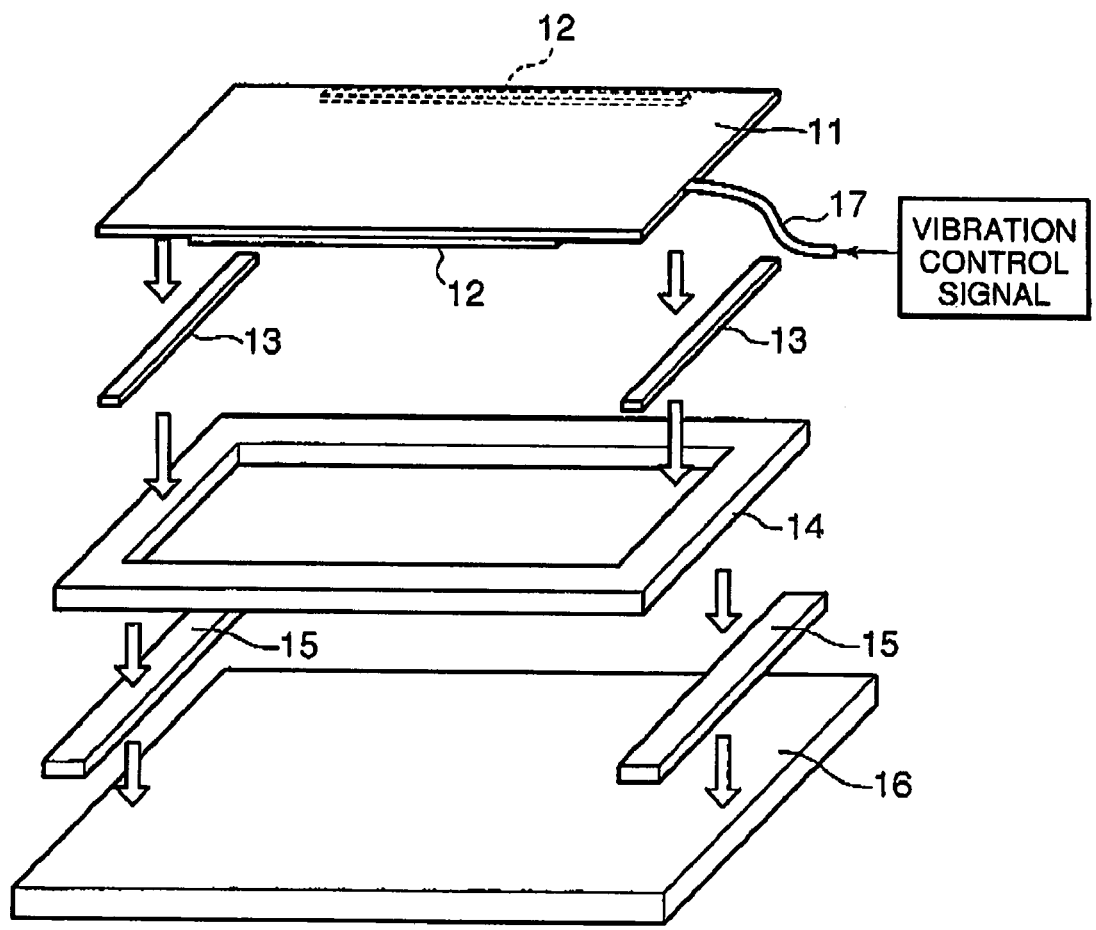
FIG. 2 is an exploded perspective view of the electronic apparatus of FIG. 1.
Figure 3:
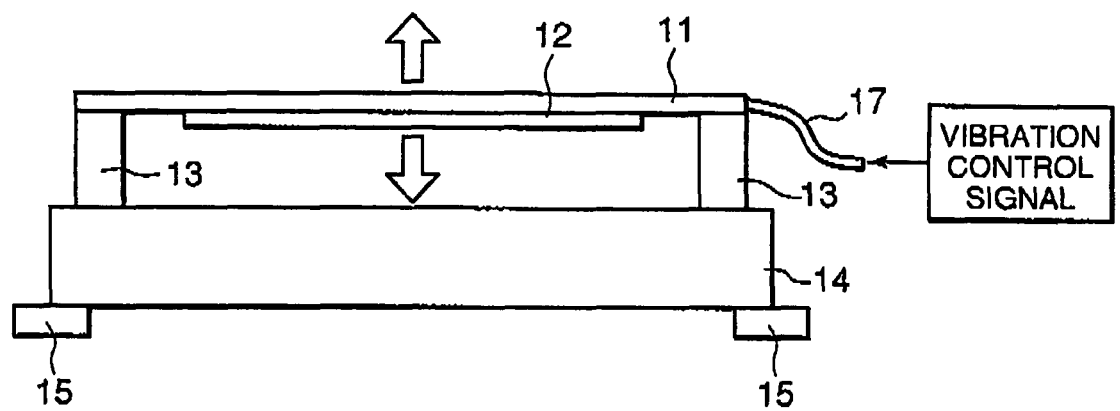
FIG. 3 is a schematic diagram for describing a vibrating state of a touch panel included in the electronic apparatus of FIG. 1.

Referring to FIGS. 1 to 3, a description will be directed to an electronic apparatus according to a first embodiment of this invention.

FIG. 1 is a perspective view of the electronic apparatus (or a panel assembly) of the first embodiment while FIG. 2 is an exploded perspective view thereof.

The electronic apparatus includes a rectangular touch panel (or a flat vibrating body) 11 having a glass or resinous substrate at a rear side thereof. On a rear surface of the touch panel 11, pair of vibrating elements 12 are fixed along upper (or rear side of FIG. 2) and lower (or front side of FIG. 2) edges of the touch panel 11. The rear surface of the touch panel 11 corresponds to an exposed surface of the glass or resinous substrate. Further, on the rear surface of the touch panel 11, pair of fixing cushions 13 are fixed along right and left edges of the touch panel 11. A fixing frame 14 has a frame or rectangular shape, which is nearly equal to or slightly larger than the touch panel 11 in length and breadth, to support the touch panel through the fixing cushions 13. Pair of vibration absorbing members 15 are fixed on a rear surface of the fixing frame 14 along right and left edges of the fixing frame 14. A chassis 16 is attached to the fixing frame 14 by the use of the vibration absorbing members 15.

The touch panel 11 is configured like a known touch panel.

The vibrating elements 12 are piezoelectric elements, actuators, or the like, and are connected to a vibration control signal line 17. The vibrating elements 12 are out of touch with the fixing frame 14. The vibrating elements 12 are expanded and contracted by a vibration control signal (or a driving voltage) supplied from an external controller (not shown) through the vibration control signal line 17. Expansion and contraction of the vibrating elements 12 elastically bend the touch panel 11 and cause flexural vibration to the touch panel 11.

The fixing cushions 13 have a long and narrow rectangular (parallelepiped) shape. The fixing cushions 13 are located parallel with each other to attach the touch panel 11 with the fixing frame 14. The fixing cushions 13 attach the touch panel 11 to the fixing frame 14 and serve as fulcrums (or nodes) in case where the touch panel 11 vibrates. The fixing cushions 13 have a thickness to leave a space for vibration of the touch panel 11 between the touch panel 11 and fixing frame 14. That is, the fixing cushions 13 are larger than the vibrating elements 12 in thickness. The fixing cushions 13 are fixed on the rear surface of the touch panel 11 along the edges, which are different from those along which the vibrating elements 12 are fixed, of the touch panel 11 by double faced adhesive tapes, adhesive material, or the like. The fixing cushions 13 are made of relatively hard material (having 40 degrees of hardness, for example) so as not to damp (or absorb) the vibration of the touch panel 11. Because the touch panel 11 is supported by the fixing cushions 13 at two parallel edges different from those on which the vibrating elements 12 are fixed, it is securely and stably supported by the fixing frame 14 through the fixing cushions 13. Furthermore, the touch panel 11 can vibrate effectively and greatly.

The fixing frame 14 is made of resin, for example, and has hardness so as not to be deformed by the vibration of the touch panel 11. The fixing cushions 13 fixed to the touch panel 11 are fixed on a front surface of the fixing frame 14 along the right and the left edges of the fixing frame 14 by double faced adhesive tapes, adhesive material, or the like.

The vibration absorbing members 15 are made of material (e.g. high density urethane foam, silicone rubber, elastomer) which is very soft in comparison with the fixing cushions 13. The vibration absorbing members 15 are fixed to the rear surface of the fixing frame 14 by double faced adhesive tapes, adhesive material, or the like, to be parallel with the fixing cushions 13. The vibration absorbing members 15 are further fixed to the front surface of the chassis 16 by double faced adhesive tapes, adhesive material, screws, or the like. The vibration absorbing members 15 absorb vibration of the fixing frame 14 caused by the vibration of the touch panel 11 and prevent or suppress transmission of the vibration from fixing frame 14 to the chassis 16.

The chassis 16 is made of resin, for example. In addition to the touch panel 11, electronic and/or electric circuit(s) or the like (not shown) is/are fixed to the chassis 16.

FIG. 3 shows a vibrating state of the touch panel 11. Upon supplying the vibration control signal (or AC voltage) to the vibration control signal line 17, the vibrating elements 12 are expanded and contracted in a lateral direction of FIG. 3 according to the vibration control signal. Because the touch panel 11 is supported by the fixing cushions 13 at the both edges thereof, the expansion and contraction of the vibrating elements 12 in the lateral direction bend the touch panel 11 elastically in an upward and downward direction as depicted by outline arrows in FIG. 3. Thus, the touch panel 11 vibrates like a beam which both ends thereof are fixed. That is, the flexural vibration is caused to the touch panel 11.

When the fixing cushions 13 are too hard, it is difficult for the touch panel 11 to vibrate. To the contrary, when the fixing cushions 13 are too soft, it absorbs the vibration of the touch panel 11. Therefore, the fixing cushions 13 need softness to allow the vibration of the touch panel 11 and hardness to hardly absorb the vibration of the touch panel 11. The fixing cushions 13 are made of material selected to meet the requirements mentioned above. It is preferable that high density micro cell polyurethane foam is used as the material of the fixing cushions 13. In particular, PORON HE-48 with 40-50 degrees of hardness or PORON H-48 with 40 degrees of hardness is more preferable as the material for the fixing cushions 13. The PORON is a brand name owned by ROGERS INOAC CORPORATION.

The vibration of the touch panel 11 vibrates the fixing frame 14 in upward and downward directions of FIG. 3. The vibration absorbing members 15 absorb the vibration of the fixing frame 14 to prevent or suppress transmission of the vibration from the fixing frame 14 to the chassis 16. Thus, the vibration absorbing members 15 suppress vibration of the electronic and/or electric circuit(s) fixed to the chassis 16. Therefore, reliability of the whole electronic apparatus is improved.

As mentioned above, in this embodiment, the vibrating elements 12 are provided along the upper and the lower edges which are long sides of the touch panel 11 while the fixing cushions 13 are provided along the right and the left edges which are short sides of the touch panel 11. However, the vibrating elements 12 may be provided along the right and the left edges which are short sides of the touch panel 11 while the fixing cushions 13 may be provided along the upper and the lower edges which are long sides of the touch panel 11. In this case, the vibration absorbing members 15 is disposed between the fixing frame 14 and the chassis 16 along the upper and the lower edges of the fixing frame 14 to be parallel with the fixing cushions 13.

Figure 4A:
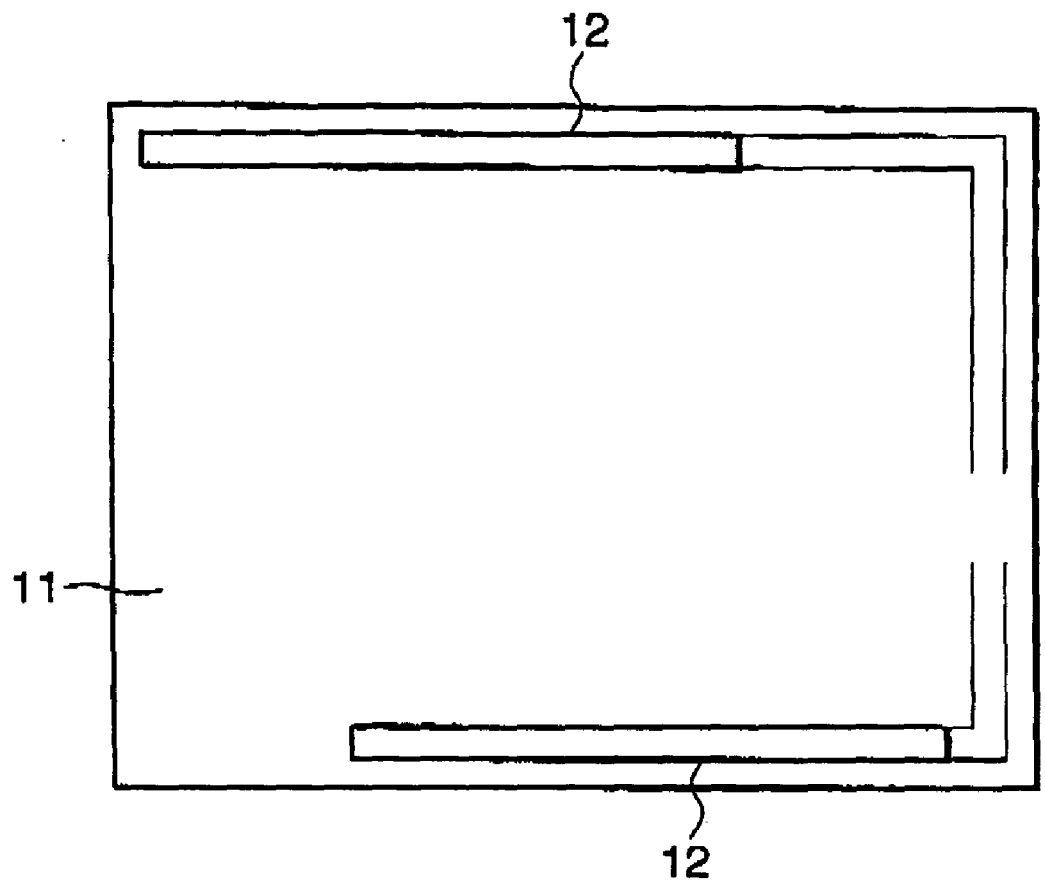
FIG. 4A is a schematic plane view showing a variation of the electronic apparatus of the first embodiment.
Figure 4B:
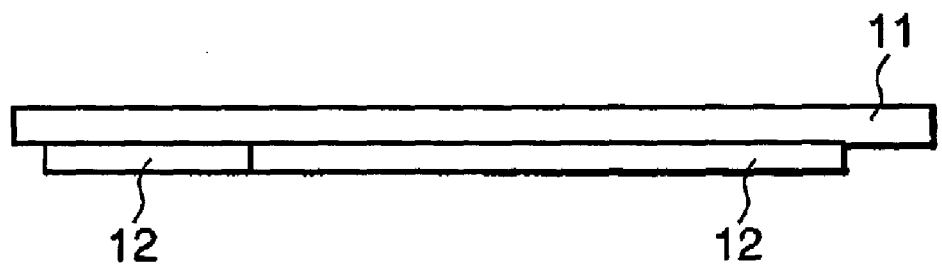
FIG. 4B is a schematic side view of the electronic apparatus of FIG. 4A.

Furthermore, it is unnecessary that the vibrating elements 12 stretch from one ends of the upper and the lower (or the right and the left) edges to the other ends of the touch panel 11. The vibrating elements 12 may be provided, for example, as illustrated in FIGS. 4A and 4B. That is, one of the vibrating elements 12 may be provided at the right hand side of the upper/lower edge while the other may be provided at the left hand side of the lower/upper edge. In addition, the number of the vibrating elements 12 is not limited to two. The number may be decided on one or more according to the size and/or the shape of the touch panel (or the flat vibrating body) 11.

Next, referring to FIGS. 5 to 7, the description will be made about an electronic apparatus (i.e. a POS terminal) according to a second embodiment of this invention.

Figure 5:
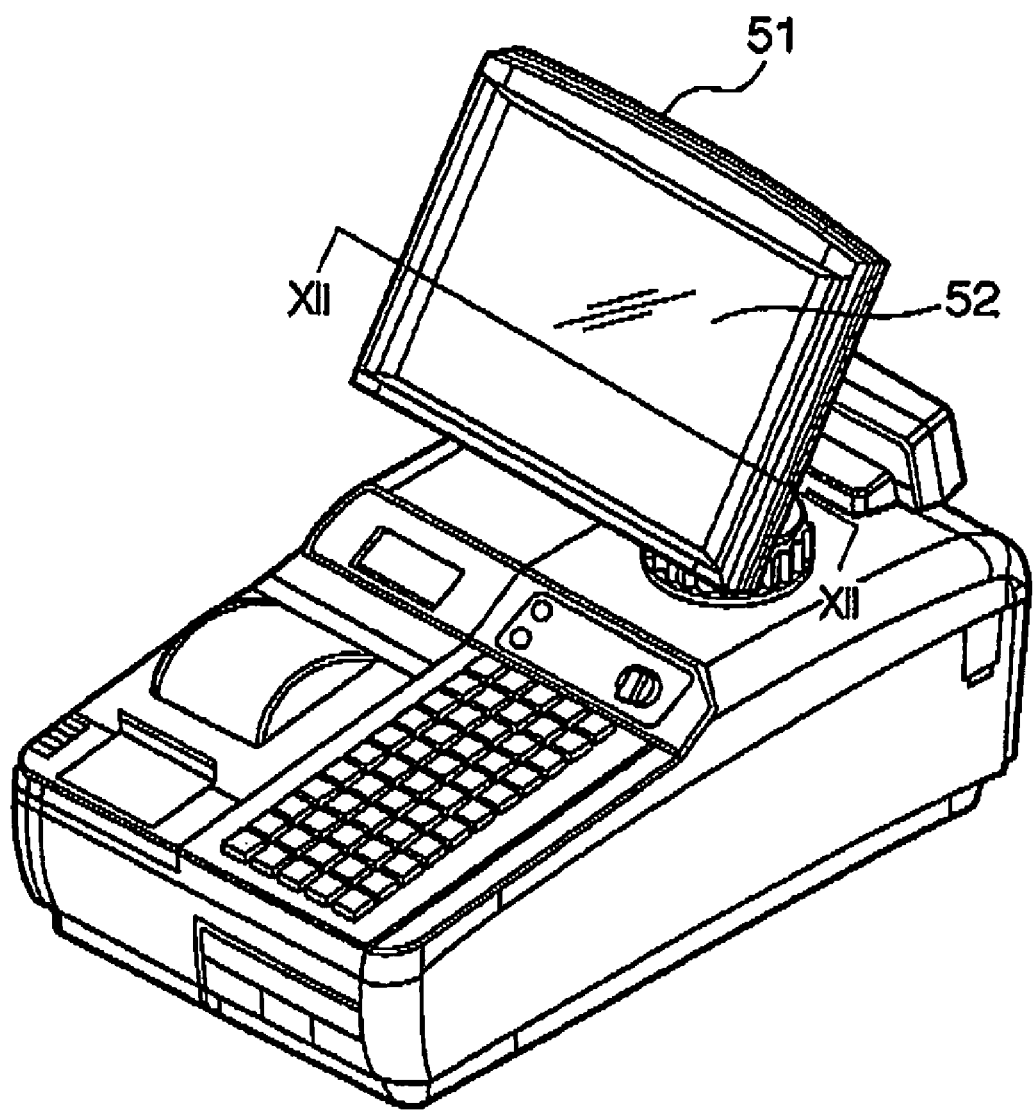
FIG. 5 is a perspective view of an electronic apparatus according to a second embodiment of this invention.
Figure 6:
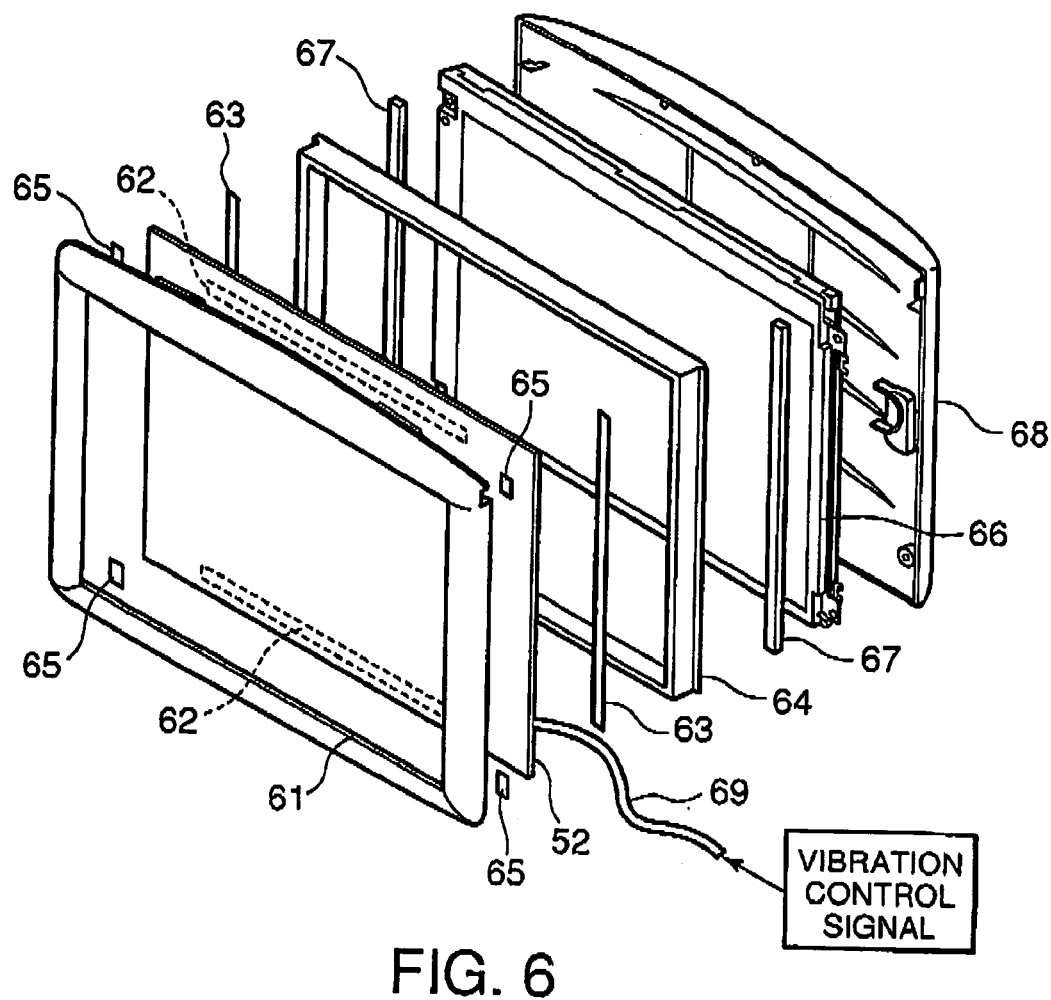
FIG. 6 is an exploded perspective view of a display and touch panel portion included in the electronic apparatus of FIG. 5.

The electronic apparatus of FIG. 5 has a display and touch panel portion 51. The display and touch panel portion 51 includes a touch panel 52 with a vibrating function. FIG. 6 is an exploded perspective view of the display and touch panel portion 51. FIG. 7 is a partly sectional view of the display and touch panel portion 51.

The display and touch panel portion 51 serves as a display unit for displaying information and as an input unit for receiving input data. The display and touch panel portion 51 includes a front bezel 61, vibrating elements 62, fixing cushions 63, a fixing frame 64, pressing cushions 65, a liquid crystal display panel (LCD) 66, vibration absorbing members 67, and a rear cover (or a chassis) 68, in addition to the touch panel 52. A combination of the touch panel 52, the vibrating elements 62, the fixing cushions 63, the fixing frame 64, the vibration absorbing members 67, and the rear cover 68 corresponds to the panel assembly of FIG. 1. The front bezel 61 and the rear cover 68 form a housing for housing the touch panel 52, the LCD 66, and so on.

The touch panel 52 is similar to a known touch panel and configured to detect coordinates representing a pressed position on a surface thereof. Furthermore, the touch panel 52 is formed by the use of transparent substrate, transparent electrodes, transparent insulating films, and so on, so that display of the LCD 66 can be seen through the touch panel 52.

The vibrating elements 62 are unimorph type piezoelectric elements, for example. To provide a vibrating function to the touch panel 52, the vibrating elements 62 are fixed to a glass (or resinous) substrate of the touch panel 52 along upper and lower edges of the touch panel 52. The surface of the glass substrate corresponds to the rear surface of the touch panel 52. The number of the vibrating elements 62 is not limited to two and may be at least one. At any late, one or more vibrating elements may be fixed to the touch panel 52 along the upper edge and/or the lower edge of the touch panel 52. The vibrating elements 62 are connected to a vibration control signal line 69. The vibrating elements 62 are expanded and contracted by supplying a vibration control signal (or AC voltage) through the vibration control signal line 69 and flexural vibration is caused to the touch panel 52.

The fixing cushions 63 are made of PORON HH-48 (the brand name), for example. The fixing cushions 63 are fixed to the rear surface of the touch panel 52 along edges different from those on which the vibrating elements 62 are fixed. The fixing cushions 63 are further fixed to the front surface of the fixing frame 64 and thereby the touch panel 52 is attached to the fixing frame 64. In other words, the fixing frame 64 supports the touch panel 52 through the fixing cushions 63. The fixing cushions 63 serve as fulcrums when the touch panel 52 vibrates. As mentioned regarding the first embodiment, it is desirable that the fixing cushions 63 are made of material which allows the touch panel to vibrate and which can avoid damping the vibration of the touch panel 52 as possible and which is neither too soft nor too hard. For example, the material may have about 40 degrees of hardness. When the fixing cushions 63 are too hard, it is difficult for the touch panel 52 to vibrate. To the contrary, when the fixing cushions 63 are too soft, it absorbs the vibration of the touch panel 52 to reduce amplitude of the vibration.

Figure 7:
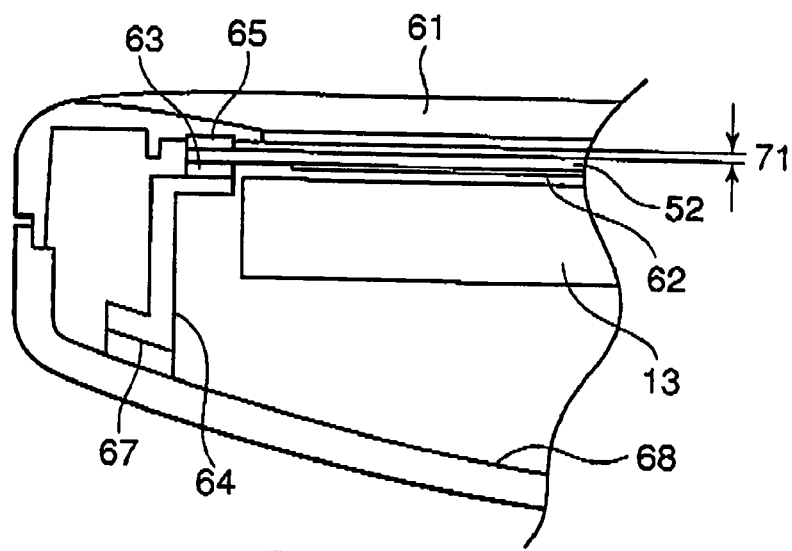
FIG. 7 is a partly sectional view taken along a line VII-VII of 5.

As shown in FIG. 7, the pressing cushions 65 are disposed between the front bezel 61 and the touch panel 52 to make an interval 71 between them. The pressing cushions 65 are designed so as not to prevent and absorb the vibration of the touch panel 52. Furthermore, the pressing cushions 65 are designed so that the touch panel 52 does not touch (or tap) the front bezel 61 during the vibration thereof. To meet these conditions, material and size of the pressing cushions 65 are appropriately selected and decided. In this embodiment, the pressing cushions 65 made of soft urethane form, e.g. POLON L32 (the brand mane), are disposed at vicinities of four corners of the touch panel 52. Because the pressing cushions 65 are disposed at the vicinities of the four corners of the touch panel 52, the touch panel 52 is further securely and stably held without preventing and absorbing the vibration thereof.

The LCD 66 has a known configuration and size for being placed at the inside of the fixing frame 64. The LCD 66 is fixed to the rear cover 68 by means of, for example, screws.

The vibration absorbing members 66 are fixed to the rear surface of the fixing frame 64 and to the rear cover 68. Consequently, the fixing frame 64 is fixed to and supported by the rear cover 68. The vibration absorbing members 66 are made of material which is very soft in comparison with that of the fixing cushions 63. The vibration absorbing members 66 absorb the vibration of the fixing frame 64 to prevent or suppress transmission of the vibration from the fixing frame 64 to the rear cover 68.

In the structure mentioned above, the touch panel 52 vibrates according to wave form of the vibration control signal by the use of the fixing cushions 63 as fulcrums, when the vibration control signal is supplied to the vibrating elements 63 through the vibration control signal line 69. Because the fixing cushions 63 hardly absorb the vibration of the touch panel 52, the vibration is transmitted to fixing frame 64 and thereby the fixing frame 64 vibrates. The vibration of the fixing frame 64 is absorbed (or damped) by the vibration absorbing members 67 and hardly transmitted to the rear cover 68. Therefore, the vibration is also hardly transmitted to the LCD 66 fixed to the rear cover 68. Thus, it is prevented or suppressed that the vibration of the touch panel 52 exercises a harmful influence on the components, which include the LCD 66, fixed on the rear cover 68. Therefore, reliability of the whole electronic apparatus is improved.

According to the embodiment, the electronic apparatus vibrates the touch panel 52 when an operator executes input operation to the touch panel 52. Consequently, operation feeling is given to the operator by the touch panel 52.

While this invention has thus far been described in conjunction with the preferred embodiments thereof, it will readily be possible for those skilled in the art to put this invention into practice in various other manners. For example, the electronic apparatus may be an automatic teller machine (ATM), a point of sale (POS) terminal, a personal computer (PC), a personal digital assistant (PDA), a mobile telephone, or the like. At any rate, this invention is applicable to the electronic apparatus including a touch panel or a vibrating board with vibrating function.

What is claimed is:

1. An electronic apparatus comprising
a flat vibrating body having a rectangular shape;
a chassis used for supporting said vibrating body;
a fixing frame disposed between said vibrating body and a chassis;
a pair of vibrating elements fixed to said flat vibrating body along one of two pairs of parallel edges of said flat vibrating body to bend said vibrating body;
a pair of fixing cushions located between said flat vibrating body and said fixing frame and held to said vibrating body and said fixing frame along the other of said two pairs of parallel edges of said flat vibrating body to serve as a fulcrum for bending vibration of said vibrating body; and
a pair of vibration absorbing cushion located between said fixing frame and said chassis to be parallel to said fixing cushions and held to said fixing frame and said chassis, wherein
said vibration absorbing cushions suppresses transmission of vibration from said fixing frame to said chassis.

2. An electronic apparatus as claimed in claim 1, wherein said vibrating body comprises a touch panel.

3. An electronic apparatus as claimed in claim 2, further comprises a liquid crystal display panel held to said chassis.

4. An electronic apparatus as claimed in claim 1, wherein said at least one vibration absorbing cushion is softer than said at least one fixing cushion.

* * * * *

UNITED STATES PATENT AND TRADEMARK OFFICE
CERTIFICATE OF CORRECTION

| | | |
|---|---|---|
| PATENT NO. | : 8,203,534 B2 | Page 1 of 1 |
| APPLICATION NO. | : 11/344065 | |
| DATED | : June 19, 2012 | |
| INVENTOR(S) | : Hideki Nishimura and Syunichi Yamashita | |

It is certified that error appears in the above-identified patent and that said Letters Patent is hereby corrected as shown below:

On the Title Page, Item (56), Foreign Patent Documents, Line 1: delete "12/2003" and insert -- 02/2003 --.

In the Specifications:

Column 2, Line 9: delete "TEE" and insert -- THE --.

Column 3, Line 66: delete "HE-48" and insert -- HH-48 --.

Signed and Sealed this
Tenth Day of September, 2013

Teresa Stanek Rea
*Acting Director of the United States Patent and Trademark Office*